United States Patent [19]

Kaminsky et al.

[11] 3,945,578

[45] Mar. 23, 1976

[54] MACHINE FOR WINDING CASINGS

[76] Inventors: Igor Vasilievich Kaminsky, ulitsa Lenina, 51, kv. 12; Viktor Alexeevich Pimenov, ulitsa Donetskaya, 35, kv. 57; Genrikh Fedorovich Severov, ulitsa pervomaiskaya, 29, kv. 4, all of Severodonetsk Luganskoi oblasti, U.S.S.R.

[22] Filed: July 31, 1974

[21] Appl. No.: 493,726

Related U.S. Application Data

[63] Continuation of Ser. No. 284,460, Aug. 28, 1972, abandoned, which is a continuation-in-part of Ser. No. 4,954, Jan. 22, 1970, abandoned.

[52] U.S. Cl. .......................... 242/7.21; 242/158 B
[51] Int. Cl.² .................. B65H 54/64; B65H 54/28
[58] Field of Search .......... 242/158 B, 158 R, 7.21, 242/7.22, 2, 3, 43 R

[56] References Cited
UNITED STATES PATENTS

| 2,964,898 | 12/1960 | Werner | 242/158 B X |
| 3,133,236 | 5/1964 | McCauley | 242/2 UX |
| 3,146,962 | 9/1964 | Hardwick | 242/158 B X |
| 3,174,388 | 3/1965 | Gaubatz | 242/7.21 |
| 3,250,493 | 5/1966 | Burkley et al. | 242/158 B |
| 3,331,722 | 7/1967 | Ponemon | 242/7.21 |
| 3,367,586 | 2/1968 | Eshbaugh | 242/158 B UX |
| 3,499,616 | 3/1970 | McClean | 242/158 B |

*Primary Examiner*—Stanley N. Gilreath
*Attorney, Agent, or Firm*—Haseltine, Lake & Waters

[57] ABSTRACT

A machine for winding casings on mandrels, comprising a mechanism to rotate the mandrel, a carriage with a filament-guiding head moving in guides parallel to the axis of the mandrel, and a mechanism to move the carriage. The latter mechanism includes an endless Gall's chain whose shape is defined by curved guide plates and which transmits motion from the uniformly rotating mandrel to the non-uniformly reciprocating carriage by means of a pin of a vertical slide which is hingedly connected to a link of the endless chain. The shape of the guide plates is chosen so that with a uniform continuous-path movement of the chain link, the carriage with the head moves in conformity with an equation of motion of its feed eye, as a function of the angle of rotation of the mandrel, to wind closed casings of any chosen shape along geodesic lines.

2 Claims, 3 Drawing Figures

MACHINE FOR WINDING CASINGS

This application is a continuation application of Ser. No. 284,460; filed Aug. 28, 1972 now abandoned, which is a continuation-in-part application of Ser. No. 4,954, filed Jan. 22, 1970, now abandoned.

1. INTRODUCTION.

The present invention relates to devices for producing wound casings, and more exactly to machines used to form casings on mandrels by winding thereon strands, sliver, or filaments, for example, of resin-impregnated glass fibre.

Such casings can be employed, for instance, as pressure vessels featuring equal strength in all directions, etc.

2. STATE OF THE ART.

Known in the prior art are machines to wind casings on mandrels (see U.S. Pat. No. 3367586), comprising a mechanism to rotate the mandrel, a filament guide, and a mechanism to move the latter.

In this prior-art machine, the mechanism for moving the filament guide is essentially an electromechanical system provided with a program control and a follow-up drive. The actuating element of the system is a servomotor which ensures displacement of the filament guide in accordance with a program recorded on a graph band secured on a rotary drum.

One of the disadvantages of this prior-art machine is a complex design of the mechanism for moving the filament guide, which reduces the reliability of the device, as well as the precision of filament laying.

Also known are machines to wind casings on mandrels (see U.S. Pat. No. 3250493), comprising a mechanism to rotate the mandrel, a carriage with a filament guide head, a mechanism to move the carriage relative to the mandrel which includes an endless flexible band whose position in space and shape is predetermined by guide plates, and whose shape exactly conforms to the profile of the outer surface of the mandrel, said tie transmitting motion from the mandrel rotating mechanism to the carriage with the filament guide he by means of a pin connected to an element of the endless flexible band and disposed in a transverse slot of the carriage.

This machine is disadvantageous in that it can perform only cosswise winding of filaments, i.e., it can lay rings of filament only at an angle to the axis of the mandrel that almost exactly coincides with 90°. Winding closed casings along geodesic paths at any winding angle of the filament to the mandrel axis from 0° to 90° is impossible with this machine.

It is an object of the invention to provide a machine for producing casings on mandrels that permit winding closed casings along geodesic lines at any filament winding angle to the axis of the mandrel.

Another object of the invention is to provide a machine for winding casings, of simpler design which at the same time ensures high accuracy in laying the filament.

In accordance with the aforesaid and other objects, the invention relates to a machine to form a machine to form casings on mandrels along geodesic lines by winding thereon, for example, filaments of resin-impregnated glass fibre, comprises a mechanism to rotate the mandrel, a carriage with a filament-guiding head, and a mechanism to move the carriage relative to the mandrel, including an endless flexible band the position in space and the shape of which is predetermined by guide plates, and which transmits motion from the mandrel rotating mechanism to the carriage with the filament-guiding head by means of a pin connected to an element of the flexible band and disposed in a transverse slot of the carriage.

According to the invention, the shape of the guide plates is chosen so that with a uniform continuous-path movement of the connected element of the flexible band, the projection of its velocity onto the axis of rotation of the mandrel (in an appropriate coordinate system) varies in conformity with an equation of motion of the filament-guiding-head, to wind casings of desired shapes along the geodesic lines.

It is expedient to define the shape of the guide plates in a rectangular system of coordinates X,Y by the following relationship:

$$y = \int \sqrt{A^2 \left(\frac{d\psi}{dx}\right)^2 - 1}\, dx + c$$

where $x$ is the carriage displacement;

$\psi = f(x)$ - is the angle of turn of the mandrel as a function of displacement $x$ of the carriage with the filament-guiding head, which function is determined by a chosen geodesic line;

A - a constant characterizing the relationship between the rate of motion of the connected element of the endless flexible band and the rotational speed of the mandrel, depending on a chosen winding angle;

C - an integration constant which can be assumed to equal zero; and

Y - the ordinate of a curve defining the shape of the guide plates.

It is also expedient to use as the endless flexible band an endless chain, such as a Gall's chain, one of the links of which is connected to the pin which itself is connected to one of the elements of the flexible band.

The machine to wind casings made according to the present invention enables the manufacture of closed casings by the method of continuous winding, provides for highly accurate laying of the filament along geodesic paths, has a simple design, and fearures high reliability.

Other objects and advantages of the present invention will become clear from the following discussion of a particular exemplary embodiment thereof with references to the accompanying drawings, wherein.

Figure 1:
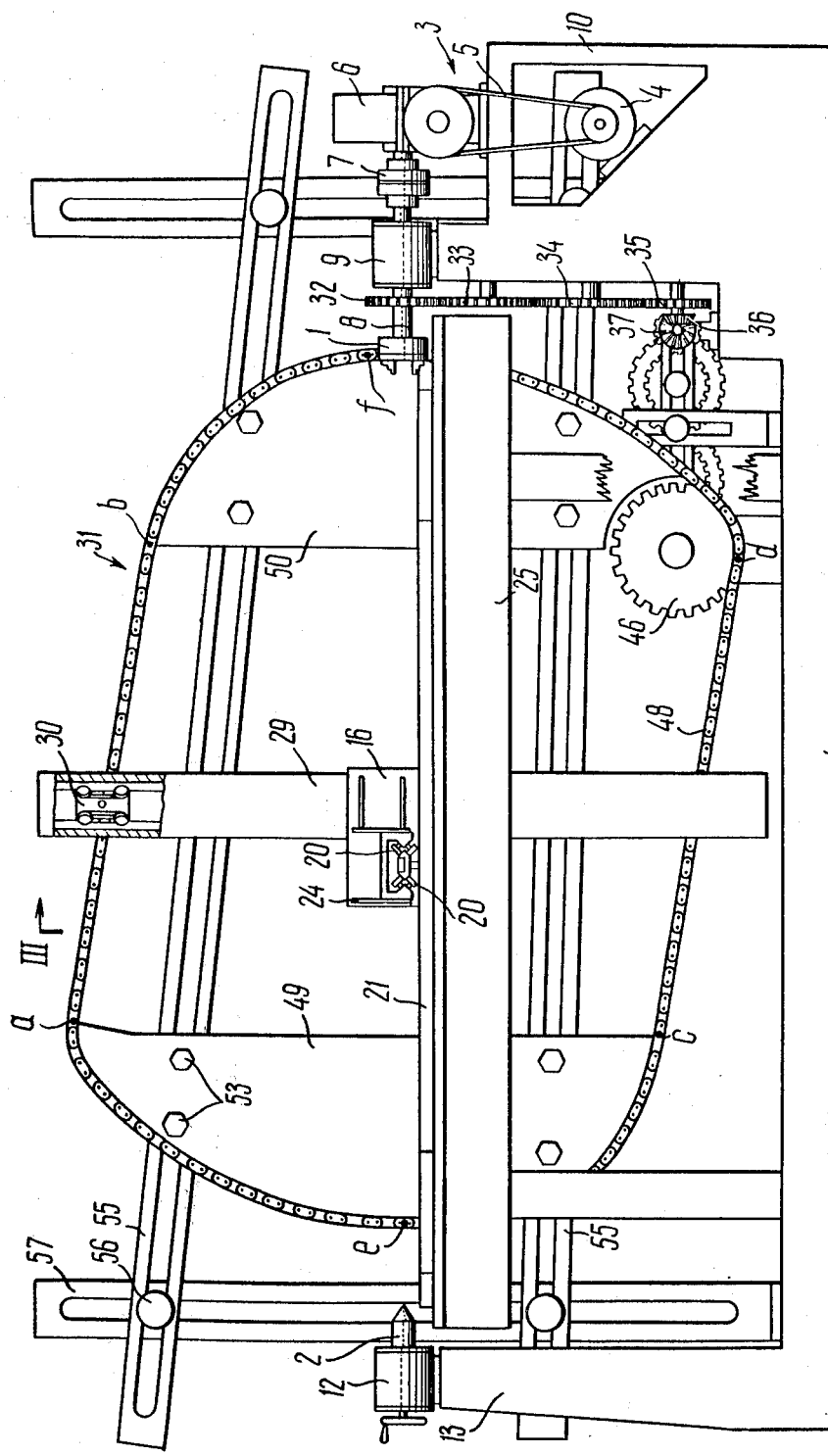
FIG. 1 is a front view of the machine for winding casing according to the invention.

For clarity, the machine to wind casings is shown in FIG. 1 without a mandrel whereon casings are wound. A shaft of the mandrel is fixed in a clamping chuck 1 and a back stop 2, and is brought into rotation by a rotating mechanism 3 comprising an electric motor 4, a V-belting 5, a worm reducer 6, an elastic coupling 7, a spindle 8, and a front bearing 9. The mandrel rotating mechanism 3 is housed in a headstock 10 of a bed 11. The back stop 2 is supported by a back bearing 12 which is fixed in a tailstock 13 of bed 11.

Figure 2:
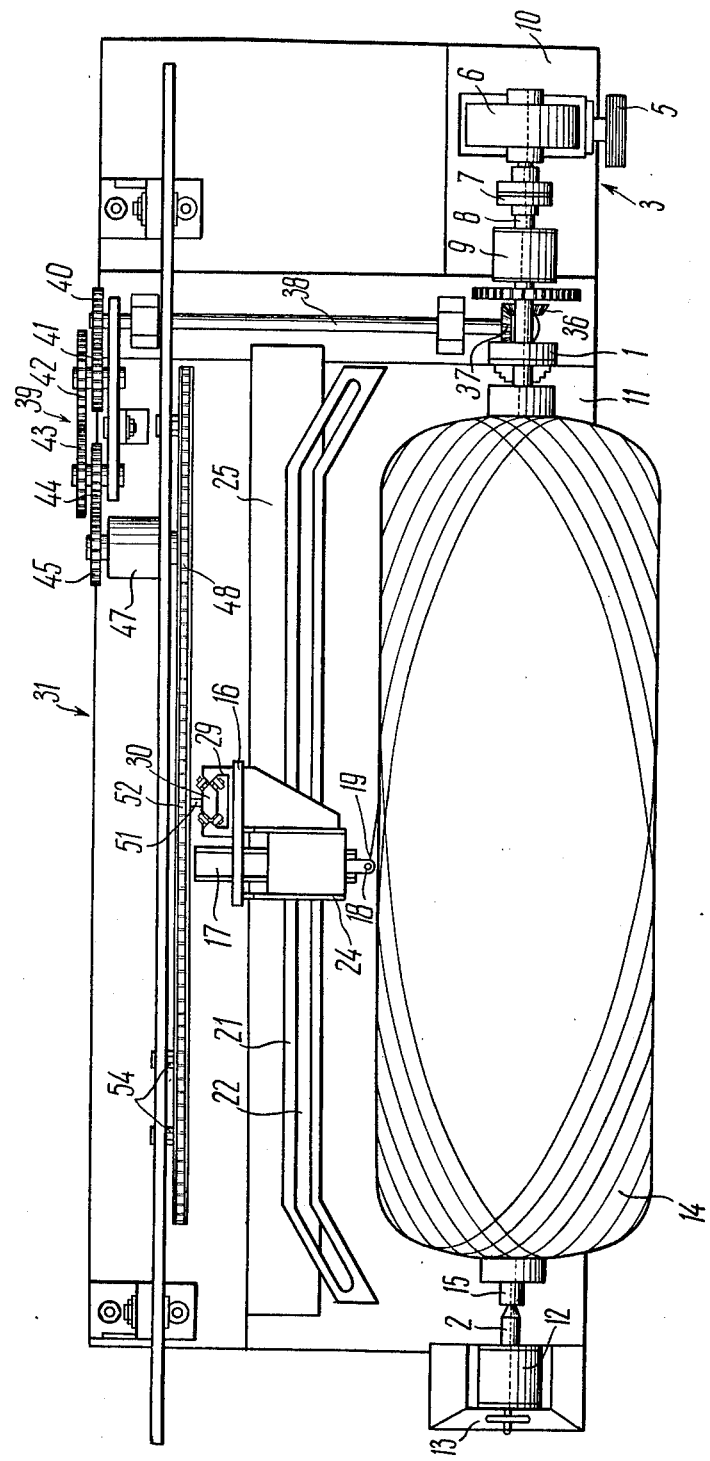
FIG. 2 is a plan view of the machine of FIG. 1.

FIG. 2, which is a plan view of the machine for winding casings, shows a mandrel 14 mounted on a shaft 15, the latter being fixed in the chuck 1 and the back stop 2. A carriage 16 mounts a filament-guiding head 17 having at its end a rigidly secured feed eye 18, passing there-through toward mandrel 14 is a winding material 19 which is, for example, a resin-impregnated fiberglass filament.

The filament-guiding head 17 can with the aid of rollers 20 (FIG. 1) move relative to carriage 16 toward the axis of rotation of mandrel 14 (FIG.2). These displacements are determined by a guide plate 21 whose central slot 22 accommodates a roller 23 (FIG.3) fixed on the filament-guiding head 17. The filament-guiding head 17 is essentially a prism whose side faces rest on four pairs of rollers 20 (FIG.1) whch are attached to a bracket 24 of carriage 16.

Carriage 16 itself can in turn freely travel in guides 25 parallel to the axis of rotation of mandrel 14. The movement of carriage 16 is based on the principle of rolling, for which purpose guides 25 have two prisms 26 (well seen in FIG. 3) wherealong rolling are four pairs of rollers 27 secured on an extension 28 of carriage 16. Besides, carriage 16 has a transverse guides 29 (FIG. 2) whose design is similar to that of guides 25, i.e., it has inner prisms wherealong a transverse slide 30 can freely travel on four pairs of rollers (not identified by reference numerals).

A mechanism 31 (FIG.1) for moving carriage 16 controls the movement of the latter in guides 25, and comprises only mechanical elements, namely: change gears 32, 33, 34, and 35 for coarse adjustment, which are brought into rotation by the mandrel rotating mechanism 3, a pair of bevel gears 36 and 37, a cross shaft 38 (FIG.2), a gearbox 39 with change gears 40, 41, 42, 43, 44, and 45 for fine adjustment, a driving sprocket 46 (FIG.1), its support 47 (FIG.2), and a flexible band which in the present case is an endless Gall's chain 48.

The position in space and shape of chain 48 are defined by curve by guide plates 49 (FIG.1) and 50 and the driving sprocket 46. Motion from chain 48 to carriage 16 is transmitted by way of a pin 51 (FIG.2) which is hinged to one of links 52 of chain 48 and is rigidly connected to the transverse slide 30, the latter being capable of free movement in the transverse guides 29.

The guide plates 49 (FIG.1) and 50 are made of hard steel plates, the thickness of which is slightly less than the distance between the inner plates of the Gall's chain 48, and which are cut to a calculated contour in the area of their contact with the Gall's chain 48.

The guide plates 49 and 50 are fixed by bolts 53 through tubular bushes 54 (FIG.2) to support rods 55 (FIG.1), the latter being secured by bolts 56 to uprights 57. Provided in the curved guide plates 49 and 50 are holes for bolts 53, which in combination with slots in the support rods 55 and uprights 57 ensure disposition of the guide plates 49 and 50 in the designed places.

The shape of the guide plates 49 and 50 is defined in a rectangular system of coordinates X,Y from the following relationship:

$$y = \int \sqrt{A^2 \left(\frac{d\psi}{dx}\right)^2 - 1}\, dx + c,$$

where $x$ is the displacement of carriage 16 with the filament-guiding head 17;

$\psi = f(x)$ - is the angle of turn of the mandrel as a function of displacement $x$ of carriage 17, which function is determined by a chosen geodesic line;

A - a constant characterizing the relationship between the rate of motion of link 52 and the rotational speed of mandrel 14, depending on a chosen wind angle; and C - an integration constant which can be assumed to equal zero.

Assuming values of x at chosen values of $\psi$ and A, obtained are the respective values of Y, i.e., the points of the curve defining the shape of the curved guide plates 49 and 50 in the rectangular system of coordinates X,Y.

Figure 3:
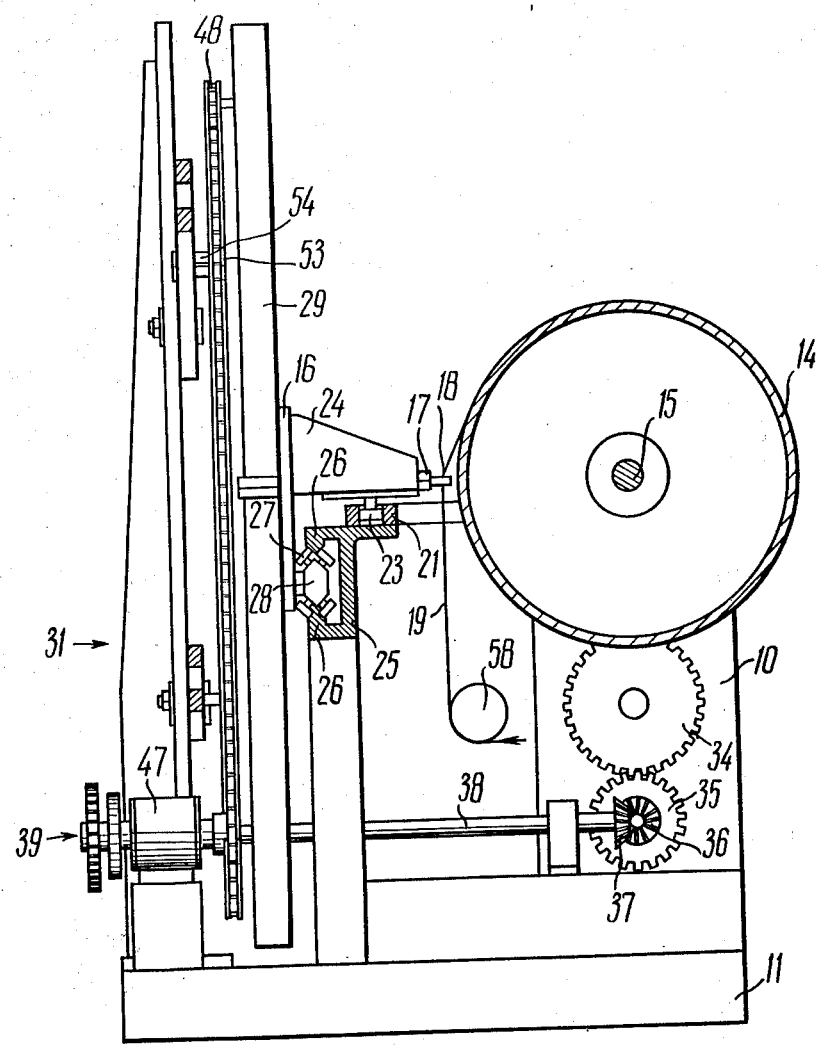
FIG. 3 is a vertical section III-III, as shown in FIG. 1 through the machine for winding casings.

As is seen in FIG.3, the filament can also be fed from the top if a spool creel (not shown in FIGS. 1,2,3) is placed over the machine. In the instant case the spool creel may be located near the machine, say, to the right of mandrel 14 as in FIG.3, and in the case of long mandrels it can be made shiftable with its drive, which is not attempted to be protected by the present invention.

Filament 19 passes from the spool creel to under mandrel 14, and through a swivel pulley 58 follows into feed eye 18. Pulley 58 should either be secured on the spool creel, or bracketed on the filament-guiding head 17, which is not shown in the drawings.

The machine for winding casings operates as follows. Before starting the work, the end of the filament is attached to mandrel 14 (FIGS. 1,2,3). Then motor 4 is energized, whose rotation by way of the V-belting 5, the worm reducer 6, the elastic coupling 7, the spindle 8, and the chuck 1 is transmitted to mandrel 14. The latter rotating at a specified speed draws the filament through feed eye 18 of head 17 with a definite force preset by the tension device arranged on a spool creel (not shown in the drawing).

Besides that, motion from the mandrel rotating mechanism 3 is transmitted through the change gears 32,33,34, and 35, the pair of bevel gears 36 and 37, the cross shaft 38, the gearbox 39, and the driving sprocket 46 to the ciosed chain 48. The position in space and shape of chain 48 in accordance with the preset law of winding is determined by the location of the curved guide plates 49 and 50, and of the driving sprocket 46.

One of links 52 of chain 48 is by means of pin 51, connected with the transverse slide 30 movable in the transverse slot 29 of carriage 16. Motion is thus transmitted to carriage 16 with the filament-guiding head 17, so that it traverses in guides 25, while in the extreme positions head 17 also shifts across carriage 16 normally to guides 25 and the transverse slot 29 toward the axis of mandrel 14, due to the action of roller 23 engaging guide plate 21.

When link 52 is within rectilinear sections ab and cd of chain 48 which are inclined to the axis of rotation of mandrel 14, feed eye 13 of the filament-guiding head 17 performs a uniform and straight-line motion, thus tracking the predetermined geodesic line (helix) on the cylindrical part of the casing. When link 52 moves within curved sections aec and bfd of the chain, feed eye 18 moves with a variably decelerated velocity until link 52 reaches points e and f. At these moments the filament-guiding head 17 stops, the direction of its velocity being reversed.

While passing through sections aec and bfd, feed eye 18 forms the end surfaces of the casing which may be of conical, spherical, elliptical, isotensoid or other complex shapes, by tracking the predetermined geodesic path, and smoothly passing into a reverse helix on the cylindrical part of the casing.

It should be noted that the position in space of chain 48 as defined by the curved guide plates 49 and 50 and sprocket 46 is such that during the uniform motion of link 52 of chain 48 the projection of its velocity onto the axis of rotation of mandrel 14 strictly conforms to an equation of motion as applicable to feed eye 18 intended to form the chosen shape of the casing.

After link 52 passes through all the points of the closed curve abfdce, formed on the mandrel will be one complete loop, i.e., the geodesic line of the casing to be wound. By imposing an advance or a delay on the rotation of mandrel 14 relative to the movement of feed eye 18 of the filament-guiding head 17, each subsequent loop of the casing will be spaced some distance away from the preceding one, or close to it if this advance or delay are chosen to equal the width of the filament (sliver).

Adjustment of the advance or delay is done by the fine-adjustment change gears in box 39. When winding the next layers of the casing, the pitch of the helix can be changed to provide the required oriented strength at any point of the casing, as well as the required thickness of its wall.

Described as an exemplary embodiment thereof, the machine is intended for serial production of casings having only insignificant variations in diameter.

To extend the versatility of the machine and widen the range of the possible working speeds, employed in the mandrel rotating mechanism 3 can be other motors, gearboxes, speed variators, etc.

What we claim is:

1. A machine for winding resin-impregnated glass fiber filaments on a mandrel along geodesic lines for forming casings having convex end faces; said mandrel having an outer surface coinciding with the inner surface of a closed casing of rotation being wound and having convex end faces; a mechanism for uniformly rotating said mandrel about its longitudinal axis; guides extending in parallel with the axis of rotation of said mandrel; a carriage mounted in said guides adapted to reciprocate therein; transverse guides rigidly secured on said carriage and extending normal to a plane passing through the axis of rotation of said mandrel and said parallel extending guides; a slide mounted in said transverse guides adapted to reciprocate therein; a pin rigidly secured on said slide; a filament-guiding head movably secured on said carriage for reciprocation in the direction of the axis of said mandrel relative to said carriage; a feedeye for said filament-guiding head being secured rigidly on the latter and guiding the filaments onto said mandrel; a mechanism for moving said carriage in said guides and transmitting motion from the uniformly rotating mandrel to the non-uniformly reciprocating carriage; a driving sprocket for said mechanism for moving the carriage; a gear train for said mechanism adapted to move the carriage and transmit rotation from said mandrel to said driving sprocket; curved guide plates in said mechanism for moving the carriage; an endless flexible band in said mechanism adapted to move the carriage, said endless flexible band being in meshed engagement with said driving sprocket and enveloping said curved guide plates the latter of which define the curved shape of the endless flexible band and the path of its movement; one point on said endless flexible band being articulated to a pin on said slide; said curved guide plates defining the shape of a curved surface in a rectangular system of coordinated X, Y determined by the equation:

$$Y = \int \sqrt{A^2(d\psi/dX)^2 - 1}\, dX + C$$

wherein X = abscissa of the curve, or the displacement of said carriage in said guides;

$\psi$ = angle of turn of said mandrel from the equation $\psi = f(X)$ of the dependence of the angle of turn $\psi$ of the mandrel upon displacement X of said carriage, for winding the filaments precisely along geodesic lines;

A = a constant characterizing the ratio between the rotational speed of said mandrel and the rate of movement of said endless flexible band along its path;

C = integration constant which can be assumed to be equal to zero; and

Y = ordinate of said curve, to which corresponds the shape of curved surfaces of said curved guide plates, as a result of which, upon the movement of said point of the endless flexible band over these curved surfaces, said filament-guiding head effects the winding along geodesic lines of the curved end faces of said casings.

2. The machine for winding casings as defined in claim 1, further comprising an endless Gall's chain constituting said endless flexible band, said chain having a plurality of links, one of said links being connected to said pin.

* * * * *